(12) United States Patent
Bala

(10) Patent No.: US 7,428,545 B2
(45) Date of Patent: Sep. 23, 2008

(54) KNOWLEDGE INFERENCING AND DATA VISUALIZATION METHOD AND SYSTEM

(75) Inventor: Jerzy Bala, Potomac Falls, VA (US)

(73) Assignee: InferX Corporation, McLean, VA (US)

( * ) Notice: Subject to any disclaimer, the term of this patent is extended or adjusted under 35 U.S.C. 154(b) by 0 days.

(21) Appl. No.: 10/617,054

(22) Filed: Jul. 10, 2003

(65) Prior Publication Data

US 2004/0078378 A1 Apr. 22, 2004

Related U.S. Application Data

(60) Provisional application No. 60/394,526, filed on Jul. 10, 2002, provisional application No. 60/394,527, filed on Jul. 10, 2002.

(51) Int. Cl.
*G06F 17/00* (2006.01)
(52) U.S. Cl. .......................... 707/101; 707/100; 707/102
(58) Field of Classification Search ................. 345/420, 345/619, 156; 707/2, 3, 100–102, 104.1; 715/804, 848
See application file for complete search history.

(56) References Cited

U.S. PATENT DOCUMENTS

| | | | | |
|---|---|---|---|---|
| 5,381,158 A | * | 1/1995 | Takahara et al. | 345/156 |
| 5,767,854 A | * | 6/1998 | Anwar | 715/848 |
| 5,841,437 A | * | 11/1998 | Fishkin et al. | 345/619 |
| 5,856,828 A | * | 1/1999 | Letcher, Jr. | 345/420 |
| 6,073,115 A | * | 6/2000 | Marshall | 705/35 |
| 6,523,020 B1 | * | 2/2003 | Weiss | 706/47 |
| 6,631,364 B1 | * | 10/2003 | Rioux et al. | 707/2 |
| 6,711,577 B1 | * | 3/2004 | Wong et al. | 707/101 |
| 6,771,293 B1 | * | 8/2004 | Josephson et al. | 715/804 |

\* cited by examiner

*Primary Examiner*—Sana Al-Hashemi
(74) *Attorney, Agent, or Firm*—Seyfarth Shaw LLP (57) ABSTRACT

A method and system has an architecture that employs a unique hybrid approach for data mining that integrates advanced three-dimensional computer visualization and inference-based data generalization techniques. The present method and system is geared towards the interactive acquisition and display of visual knowledge representations. Knowledge representations, called knowledge landscapes, are employed for robust real-time classification of incoming data as well as for forecasting new unexpected trends. Knowledge landscape visualization techniques contribute to better human decision-making insights through facilitation of spatial operations such as navigation and zoom operations. A graphically appealing human computer interface and capability to visualize large and complex knowledge bases through spatial and graphical depictions of knowledge components adds to advantages and widespread applicability.

17 Claims, 8 Drawing Sheets

KNOWLEDGE INFERENCING AND DATA VISUALIZATION METHOD AND SYSTEM

CROSS-REFERENCE TO RELATED APPLICATION

The present application claims the benefit of U.S. Provisional Patent Applications Ser. No. 60/394,526 filed Jul. 10, 2002, and Ser. No. 60/394,527 filed Jul. 10, 2002, both of which are incorporated herein by reference.

STATEMENT REGARDING FEDERALLY SPONSORED RESEARCH OR DEVELOPMENT

The present invention is related to a project sponsored by the Ballistic Missile Defense Organization Project under the grant, administered by the U.S. Army Space and Missile Defense Command Contract No: DASG60-97-C-0088.

BACKGROUND OF THE INVENTION

1. Field of the Invention

The present invention relates generally to a method and system for data mining and visualization.

2. Description of the Related Art

As the 21st Century begins, we have seen an explosive growth in capabilities to both generate and collect data. It has been estimated that the amount of data in the world doubles every 20 months and the size and number of databases are increasing even faster. Advances in sensor based data collection as well as the computerization of many area of human activities have flooded decision makers with information and generated an urgent need for new techniques and tools that can intelligently and automatically assist them in transforming this huge amount of data into a useful operational and tactical knowledge.

It is recognized that information is at the heart of business operations and that decision-makers should make the best use of data to gain valuable insight into the business.

Current database management systems give access to the data stored but this is only a small part of what could be gained from the data. Traditional on-line transaction processing systems, On-Line Transaction Processes (OLTPs), are good at putting data into databases quickly, safely and efficiently but are not good at delivering meaningful analysis in return. Analyzing data can provide further knowledge about a business by going beyond the data explicitly stored to derive knowledge about the business. This is where data mining or Knowledge Discovery in Databases (KDD) has obvious benefits for any enterprise.

Data mining, or Knowledge Discovery in Databases (KDD) as it is also known, is the nontrivial extraction of implicit, previously unknown, and potentially useful information from data. This encompasses a number of different technical approaches, such as clustering, data summarization, learning classification rules, finding dependency net works, analyzing changes, and detecting anomalies.

SUMMARY OF THE INVENTION

The present invention provides a data mining tool that offers a unique visualization environment combined with advanced deep mining capabilities. The invention defines a foundation for the new information technology paradigm—visual knowledge management.

The present invention presents a unique hybrid approach for data mining that integrates advanced three-dimensional computer visualization and inference-based data generalization techniques. Whereas most data mining tools already available in the market consist of separate mining and/or data visualization components, the present method and system is geared towards the interactive acquisition and display of visual knowledge representations. Knowledge representations, called knowledge landscapes, are employed for robust real-time classification of incoming data as well as for forecasting new unexpected trends.

The present knowledge landscape visualization techniques contribute to better human decision-making insights through facilitation of spatial operations such as navigation and zoom operations. A graphically appealing human computer interface and capability to visualize large and complex knowledge bases through spatial and graphical depictions of knowledge components adds to the advantages of the present method and system.

DETAILED DESCRIPTION OF THE PREFERRED EMBODIMENTS

The present invention is an adaptable data mining tool that can significantly enhance the speed and accuracy of decision making whether in the time-critical battlefield scenarios or distributed and decision support environments. The system and method prototype is the result of a design and development effort conducted by Datamat Systems Research, Inc. under the aegis of the Ballistic Missile Defense Organization.

Figure 1:
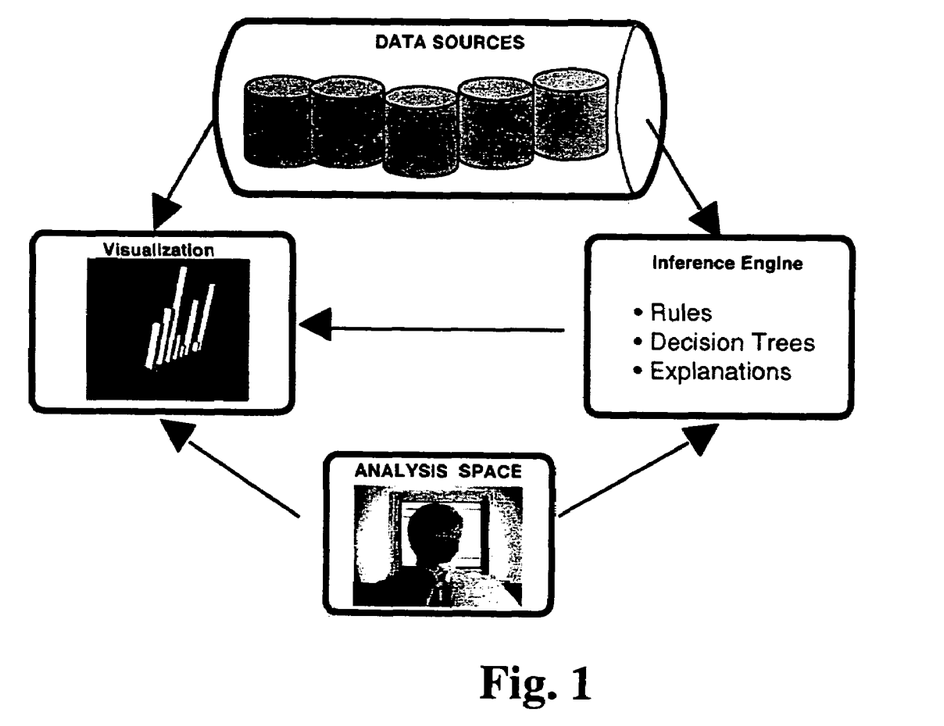
FIG. 1 is a process flow diagram as an overview of the present invention.

The uniqueness of the present system lies in its synergistic integration of advanced computer graphic/visualization and inference-based data generalization techniques. Whereas most data mining tools already available on the market consist of separate knowledge extraction and data visualization components, the invention is geared towards the interactive acquisition and display of knowledge represented as the visual landscapes (see FIG. 1). Knowledge landscapes can be employed for robust real-time classification of incoming data as well as for forecasting new unexpected trends.

The present knowledge visualization techniques contribute to better human decision-making insights through facilitation of spatial operations such as navigation and zooming. A graphically appealing human computer interface and capability to visualize large and complex knowledge bases through spatial and graphical depictions of knowledge components adds to the present invention's uniqueness.

Figure 2:
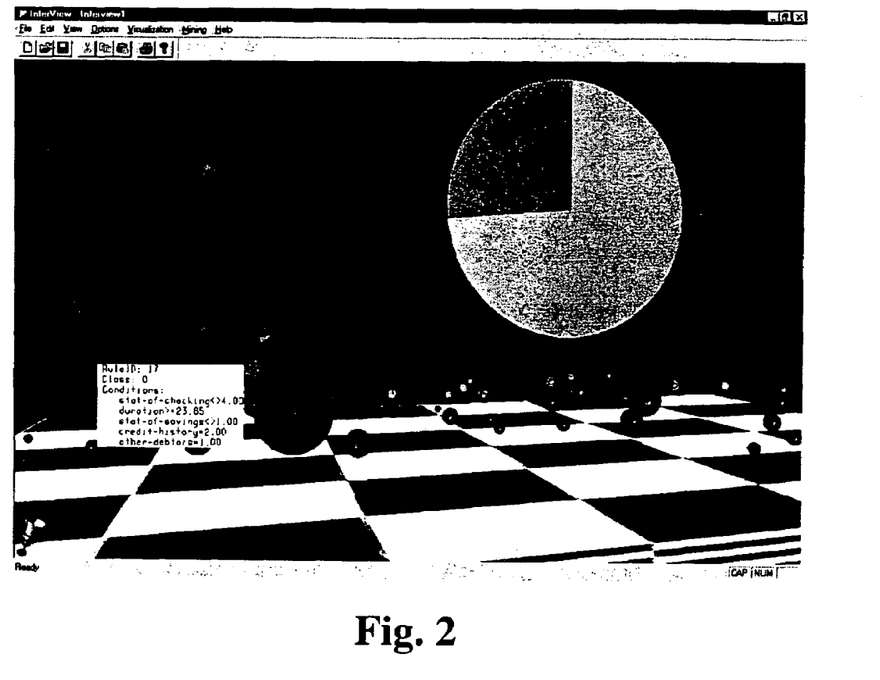
FIG. 2 is a screen show from a computer display of the visualization space according to the invention, in particular a visualization space with a two-cluster rule landscape.

The present invention includes consists of four major components: (i) visualization space, (ii) data preparation tool, (iii) inference engine, and (iv) predictor. The user interacts with the system through a visual representation space where various graphical objects are rendered. Graphical objects represent data, knowledge (e.g. as induced rules), and query explanations (decisions on unknown data identifications). The present system and method integrates graphical objects through the use of visually cognitive, human oriented depictions. A user can also examine non-graphical explanations (i.e. text based) to posed queries. Transfer of data mining and decision support processes to the visualization space according to the present invention enhances the user's capabilities to see, explore, and gain decision making insights as never before (see FIG. 2).

The following two modes of operation are currently available within the present system; (i) the data mining mode which uses the inference engine module to generate knowledge and subsequently represents it as 3D graphical objects, and (ii) the decision support mode, where the predictor module is used to support user's queries. Through its highly modular design, the invention lends itself to distributed, component-based architectures. A networked version of the product is currently being implemented, based on a new knowledge server/visualization clients paradigm.

Inference Engine

The inference engine data generalization is accomplished through the use of learning from example mechanism.

In the learning from examples paradigm, a set of training examples annotated with concept membership information is used as the basis for automatically inducing a general description for each concept. The concept description learned is correct for the given examples. Since it extends its membership information to unseen parts of the representation space it is also a good predictor for the classification of unobserved examples of the concept.

An example in this paradigm may be anything that can be expressed in terms of representation language. An example can be a physical object, a situation, a cause, or a concept. Training examples are usually described in one of the two types of representation languages: attribute-based or predicate-based. In an attribute-based representation, an example is represented as an n-tuple of attributes values, where n is a number of attributes. All n attributes define the event space. A domain is associated with each attribute used to describe examples. The domain indicates the values the attribute may assume. The values in a domain may be unordered (or nominal), ordered (or linear), or hierarchically structured. A predicate-based representation allows examples to be represented as structural descriptions. In structural descriptions, each example may consist of several objects, and a set of relationships among these objects. A predicate-based representation is more powerful than an attribute-based representation, but the limited expressiveness of an attribute-based representation allows relatively efficient learning algorithms to be designed. The attribute-based representation can be used in many real world applications.

Most inductive learning systems generate concept descriptions by detecting and describing similarities among positive examples and dissimilarities between positive and negative examples. Inductively constructing concept descriptions from training examples involves the transformation of training examples using a set of refinement operators. A refinement operator is either a specialization or a generalization operator. When applied to hypothesis or a training example, a generalization/specialization operator transforms it into a more general/special hypothesis.

Each hypothesis describes a subset of all examples, while all hypotheses representable in a given representation language form a hypothesis space. Learning can be viewed as a search process through the hypothesis space to find a description of the target concept. Generalization/specialization operators are search operators. Search heuristics are some preference criteria (also called biases). One of the most important description preference criterion is accuracy. Hypothesis accuracy depends on the completeness and consistency of this hypothesis with regard to the learning examples. Simplicity and comprehensibility are two other preference criteria.

An inductively generated description should not only classify training examples, but also unseen examples, so it should be more general than training examples. Unfortunately, induction is an error prone process. Induction is falsity preserving rather than truth preserving. That is, a concept description inductively generated from examples cannot be guaranteed correct. It may be only an approximation of the concept.

In this project a tree induction approach is undertaken for the inference engine development and implementation. The tree induction algorithm, in an iterative fashion, determines the feature which is most discriminatory and then it dichotomizes (splits) the data into classes categorized by this feature. The next significant feature of each of the subsets is then used to further partition them and the process is repeated recursively until each of the subsets contain only one kind of labeled data. The resulting structure is called a decision tree, where nodes stand for feature discrimination tests, while their exit branches stand for those subclasses of labeled examples satisfying the test.

An unknown example is classified by starting at the root of the tree, performing the sequential tests and following the corresponding branches until a leaf (terminal node) is reached indicating that some class has been decided on. Decision trees are disjunctive, since each branch leaving a decision node corresponds to a separate disjunctive case. After decision trees are constructed a tree pruning mechanism is invoked which helps to improve the generality of the trees and reduces the effects of noise in the training data. It discards some of the unimportant sub-trees and retains those covering the largest number of examples. The remaining tree thus provides a more general description of the learned concept. A tree is rewritten to a collection of rules, one for each leaf in the tree. Every path from the root of a tree to a leaf gives one initial rule. The left-hand side of the rule contains all the conditions established by the path, and the right-hand side specifies the classes at the leaf. Each such rule is simplified by removing conditions that do not seem helpful for discriminating the nominated class from other classes. The sets of rules for the classes are then ordered to minimize false positive errors. This process leads to a production rule classifier that is usually about as accurate as a pruned tree, but more easily understood by people.

Visualization Module

The inventive visualization module was developed using the Visible Decision, Inc.'s In3D tool. In3D is a cross-platform C++ class library designed to enable the creation of interactive, 3D visualization of complex information spaces. In3D implements the model-view-controller paradigm of separating an application's data (model) from its visual presentation (view). Interface elements (Controllers) act upon models, changing their values and effectively changing the views. Such a paradigm supports the creation of applications which can attach multiple, simultaneous views and controllers onto the same underlying model. Thus, a single data element can be represented in several different ways, and modified by different parts of an application.

Figure 5:
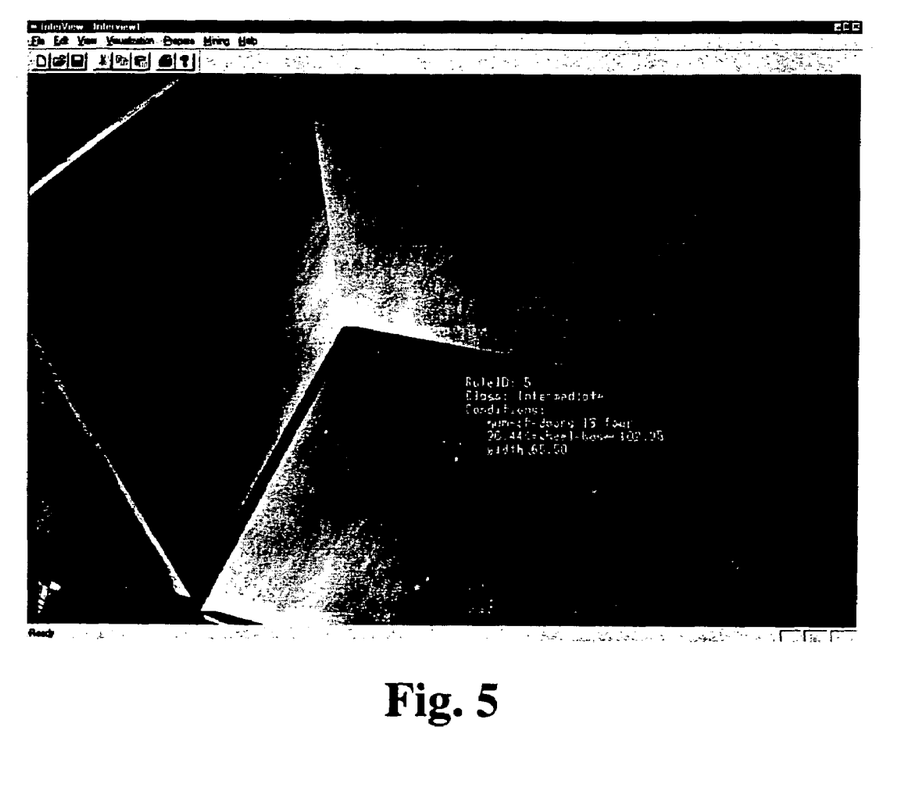
FIG. 5 is a further screen show from a computer display of the visualization space, in particular a visualization—brushing.

In3D is designed along the same lines as a layered approach. Layering is a technique for structuring software by defining and conforming to interfaces between software components. It is distinguished from other software-structuring techniques by the presence of a hierarchy: components at one level interact only with components immediately above or below them. The specific layered approach used in In3D is shown in FIG. 5.

In3D consists of three main layers: foundation, core and extensions. The lowest layer is called the foundation layer, and consists of fundamental functional components of the entire library. In addition the foundation layer also consists of:

- A cross-platform rendering library called Orca. Orca is a VRML 2.0 compliant rendering library. Orca sits atop OpenGL for high performance and accurate rendering and further more it takes full advantage of the available hardware acceleration
- A C—like interpreter for run-time expression evaluation. The purpose of this interpreter is to allow one to perform scenario analysis, predictive and sensitivity analysis, etc. The built in expression evaluator can process the input and pass it onto other parts of the application which can evaluate the expression against existing data and output the result as part of a visualization
- A schema mechanism for structuring data—schemas are ordered collections of names/typed members used to describe the layout of data. Schemas allow data models to be programmatically constructed and queried.
- A thread library to enable creation of multi-threaded applications as well to make use of multi-processor systems
- A command mechanism enabling the encapsulation of units that can be attached to interface elements.

Figure 3:
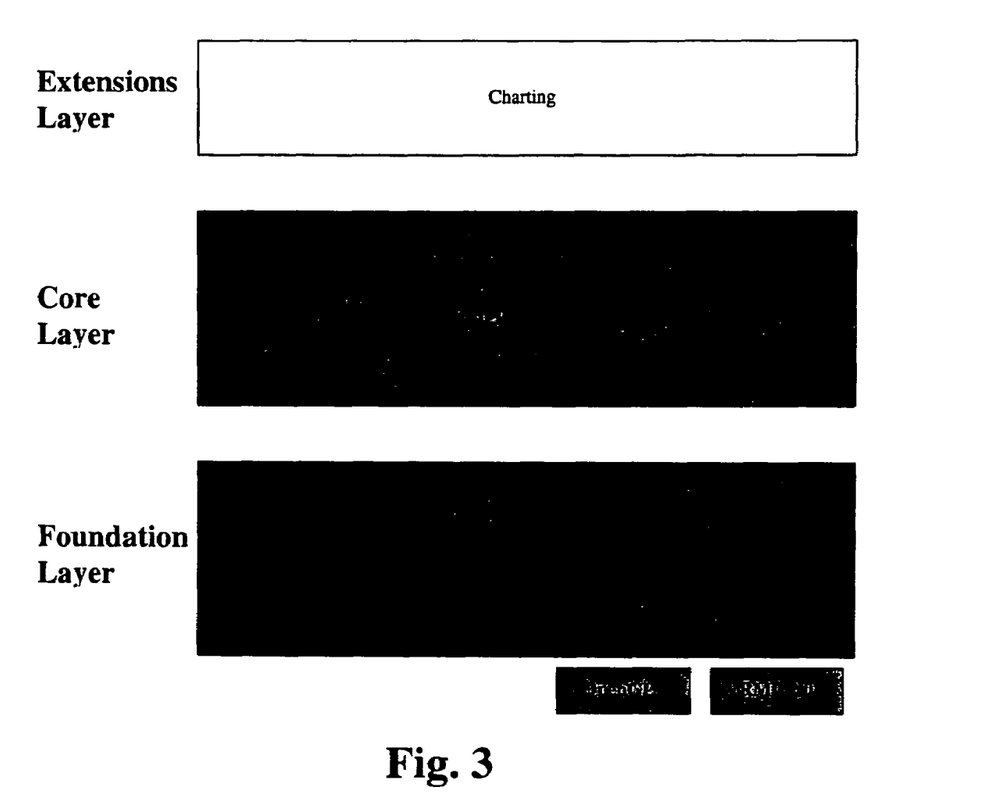
FIG. 3 is a block diagram of layers of an In3D program.

Referring to FIG. 3, the core layer of the In3D class library can be divided into two principal classes of objects: those which are used to hold data (Models) and those which are used to provide a visual representation of the data (Views). Other classes include containers, frames, mappers, sensors and controllers.

- Models—In3D structures information as models, classes which use a schema to describe their contents. Models can be constructed dynamically, or read from files. Models are attached to views and store the data to be represented by the view.
- Views—Three principal view types are provided: single, multi and compound. Single views implement a single geometric form. Multi views group multiple single views together, while compound views are aggregates of single and multi views, encapsulating their behavior and exposing a single interface.
- Containers—Containers are classes which contain objects, usually models. In3D provides a number of built-in container classes, the principal type of which are arrays. One, two and three dimensional arrays are provided.
- Frames—Frames are used to lay out and manage scene components in a visualization. They are 3D in nature, existing as a bounding box around their children. Scene components can be views, controllers, sensors, and even other frames. This hierarchy of frames defines the visualization and is rooted in a landscape.
- Mappers—Mappers help in mapping data between views and models. Each view has a map ( ) member function that contains the code to generate the view's internal state from model data.
- Controllers—A variety of controllers are provided to implement user interaction within a visualization. The visual appearance of controllers can be changes dynamically, enabling the creation of application specific user interfaces.
- Sensors—Sensors are objects which react, and generate events when they detect or sense specified conditions in the scene. Two type of sensors are provided: Visibility sensors which generate events when a region in space enters or leaves the user's field of view, and Proximity sensors which generate events when the viewer enters or exits a region in space.
- Viewers—The core layer also includes two viewers, Hemisphere (for 3D) and Planar (for 2D). Viewers provide the end-user with the means of navigating the information space.

Layers above the core library provide, and more application-specific, functionality. Of principal interest are charts. Classes to support the creation of Bar, Line, Scatter, Area, Surface and Pie charts are provided.

A representation of rules inferred by the present mining component. Rules are represented as the 3D knowledge landscapes. They contribute to better human decision making insights through facilitation of spatial operations such as navigation, zooming, etc.

The visualization module is used to display the raw data for data visualization and the knowledge learned during training by the inference engine for knowledge visualization. Specifically the rules generated by the inference engine are displayed either in their entirety or some specific rules depending upon the users choice through a Graphical User Interface (GUI). Additional statistics generated by the inference engine are also displayed through the use of intuitive colors.

Figure 4:
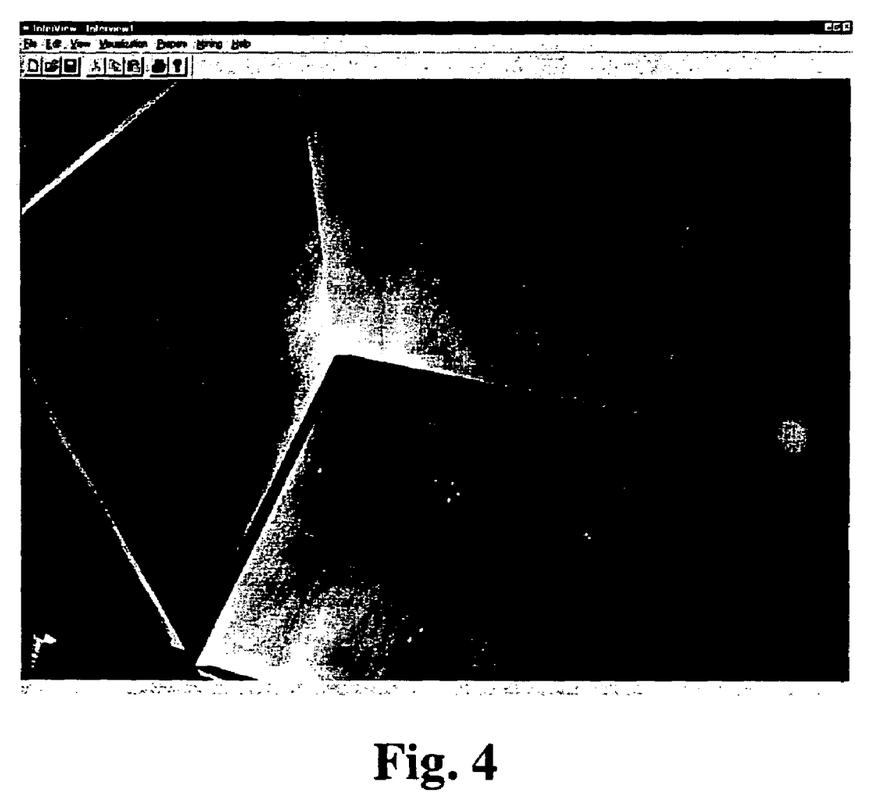
FIG. 4 is a screen show from a computer display of the visualization space, in particular a visualization—rule display.

The visualization engine displays the rules as spherical graphical objects. Each sphere essentially represents a rule. The spheres are displayed in a spiral fashion, with the rule having the highest strength in the center and the rules with the least strength as outliers. This arrangement is so chosen since this process is intuitively analogous to the standard clustering process with the cluster centers in the center. The size of the sphere represents the number of examples covered by that rule during learning. FIG. 4 displays a five class example representative of five spirals.

If the user wants to change the number of rules (spheres) to be displayed on the landscape, this can then be achieved by using the visual pruning button which is the fourth button on the visualization menu.

On positioning the mouse around any of the spheres, additional information can be obtained as to what part of the knowledge the sphere actually represents. As an example, on positioning the mouse on the largest sphere of one of the classes, it displays the index of the rule, the class to which that particular rule represents and the actual components (conditions) of that rule and is shown below in FIG. 5. This concept of positioning the sphere around it boundary is often called as 'brushing'.

Figure 6:
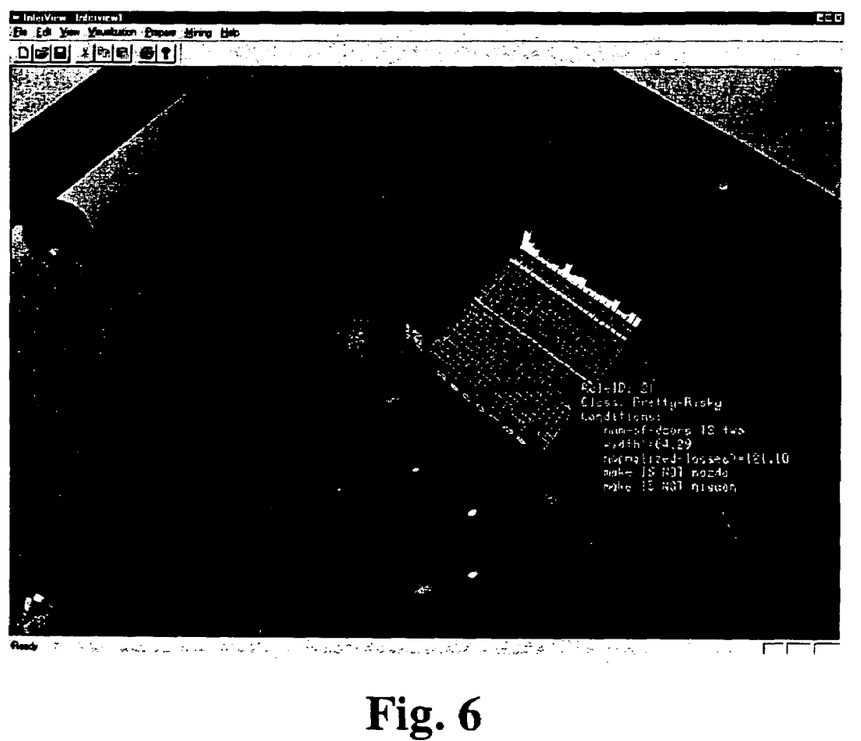
FIG. 6 is yet another screen show from a computer display of the visualization space, in particular, a visualization—semantic zooming.

In order to perform data visualization, the present system accomplishes by allowing the user to click on any sphere. This is often called as the 'semantic zooming'. By clicking on the sphere, the actual raw data being covered by that rule is displayed on a X-Y axes projection. The X axis represents the number of examples (records), the Y axis represents the number of attributes (fields) and the Z axis represents the actual values. The visualization engine internally zooms into the data visualization projection and is shown below in FIG. 6.

The following is the list of the visualization module functionalities:

- Walls ON/OFF for eliminating the walls if the user so chooses.
- Navigation for zooming onto the display; specifically one can either go back to the default position, get a close up view of the display (Zoom in), view from farther out (Zoom out), get a close up view of the walls, etc.
- Match (testing) for matching the unseen data against the knowledge learned by the inference engine.
- Visual Pruning for displaying only the necessary rules.
- Open Rule is used for displaying the rules. The number of rules is always set at a default amount. This can be changed through the visual pruning button
- Close Rule for clearing all the rules that are displayed on the landscape. This button closes the rule file.
- Wall floor type button is used for selecting the type of walls to be displayed.

With this button one can decide what kinds of textures and colors can be used to display the various walls.

Integration of Decision Tree Based Knowledge Acquisition with Three Dimensional Graphical representation of Inferred Knowledge The advantages of the present system lies in its synergistic integration of advanced computer graphic/visualization and inference-based data generalization techniques. Whereas most data mining tools already available on the market consist of separate knowledge extraction and data visualization components, the method is geared towards the interactive acquisition and display of knowledge represented as the visual landscapes. Knowledge landscapes can be employed for robust real-time classification of incoming data as well as for forecasting new unexpected trends.

The present method provides a Data Cleansing/(Noise Removal) Approach.

The present cleansing approach identifies and eliminates outliers to improve the quality of data and the effectiveness of inferred models. In this approach, system (1) acquires initial model descriptions from pre-classified attributional training data, (2) optimizes model descriptions to improve their descriptiveness, (3) applies optimized model descriptions to filtrate/improve initial training data, and (4) repeats the learning process from improved training data. The implemented algorithm extends the widely used open loop learning approach (divided into model acquisition phase and model optimization phase) into a closed loop learning approach. In the closed loop learning approach, learned and optimized model descriptions are fed back and used to filter training data for the next learning iteration. Thus, the learning program is run at least two times; the first time to acquire model descriptions for the optimization step, and the second time to acquire the final descriptions. In this approach, noise is detected on the concept description level rather than on the raw data level—where the evaluation of raw data can be impossible since the training data may be composed of numeric, symbolic, relational and structural attributes.

Explanation

Machine learning algorithms are rapidly finding useful applications in real-world domains. They are joining a family of tools that can help summarize (or synthesize) massive amounts of sensory data to support, for example, intelligent robotics systems. Traditional tools, such as various statistical-based techniques, produce results that are hard to interpret and integrate across several abstraction levels within a system. In addition, machine learning tools used in learning from real-world data can easily introduce qualitative reasoning capabilities in addition to the quantitative models presently in use by statistical methods. New machine learning tools developed for real-world domains find useful applications in engineering domains. They can be used to assist engineers with problems such as design, planning, monitoring, control, diagnosis, and analysis. On the other hand, engineering domains present significant challenges to learning systems. One of the challenges is the presence of systematic and non-systematic noise in data.

Various techniques were developed to handle noise in intelligent systems. They are frequently integrated within operators for feature/attribute extraction. Noise elimination on feature level is handled by statistical methods of feature/attribute filtration or by statistical pattern recognition methods designed to approximate the distribution of training data over the attribute space. These methods, however, operate on numerical data while engineering data includes subsymbolic and symbolic data as well. These methods tend to smooth the distribution of training data rather than identify those training examples which are erroneous (should not be taken into account during the training phase) and draw precise boundaries between classes.

Learning concept description from noisy data sets is a very difficult problem for machine learning. It is particularly important for symbolic learning programs due to their noise sensitivity. Regardless of the source, noise influences the formation and use of classification rules [Quinlan, 1986]. Inductive learning systems perform some form of generalization in order to anticipate unseen examples. A concept description generated by an inductive learning system should cover all examples (including unseen examples) of the concept (completeness criterion) and no examples of the other concepts (consistency criterion). In the case of noisy data, complete and consistent descriptions are problematic since multiple concept descriptions can partially overlap in the attribute space. This is so, because attribute noise skews the distribution of attribute value from the correct value.

There are two basic groups of approaches to learning from data with outliers. One is to allow a certain degree of inconsistent classification of training examples so that the learned descriptions will be general enough to describe basic characteristics of a concept. This approach has been taken by the ID family of algorithms [Quinlan, 1986]. The main outliers-handling mechanism for decision trees is tree pruning. There are two types of tree pruning [Mingers, 1989]: pre-pruning (example removal), performed during the construction of a decision tree, and post-pruning (tree pruning), used after the decision tree is constructed. The second approach, post-pruning, discards some of the unimportant rules/subtrees and retains those covering the largest number of examples. The remaining rules thus provide a general description of the concept. This approach has been taken by the AQ family of programs [Michalski, 1983]. Other approaches to learning from data with outliers are based on the minimum description length principle [Quinlan, 1989], cross validation to control over-fitting during the training phase [Breiman, 1984], and an integrated modification and truncation of disjuncts and conditions [Bergadano, 1992]. Related works for noise tolerant processing of visual data include robust regression methods [Meer, et. al., 1991] and random sample consensus [Fishler, 1981].

The present approach contributes to the area of noise tolerant learning by revising the traditional truncation approach (concept optimization) and by presenting a modified approach which performs better for noisy engineering data. In this modified approach, rules are optimized and subsequently they are fed back and used to filtrate the training data set [Pachowicz and Bala, 1994]. The filtration process is concept-driven rather than data-driven, where the 'filter' is prepared on the higher abstraction level of the system. The learning process is then run over again but with the filtered training data. This approach differs from the traditional data filtering performed on the input level, because the filter is learned on the higher-level and reflects actual relations between attributes and separations between classes. It also does not require prior knowledge about attribute distribution, and it is applicable to both symbolic and subsymbolic attributes.

Symbolic Learning Approach

Most learning methods share a common problem—they try to remove noise in one step through truncation/pruning of learned concept descriptions. The final concept descriptions are then based on the initial noisy training data. This also causes the complexity of concept descriptions to decrease only by the magnitude of truncated/pruned concept components and does not allow for reorganization of the concept descriptions. In this approach, the resulting descriptions still reflect the influence of erroneous training examples on the formation of larger disjuncts/subtrees. Truncation/pruning processes only partially mitigate this influence by eliminating those components (subtrees/disjuncts) of concept descriptions, for example, which are 'light' (i.e., created by fewer training examples). Such truncation/pruning is supported by higher confidence that the 'light' concept components are generated by a larger proportion of erroneous examples than the 'heavy' concept components. So, some of light concept components can be removed from final descriptions, increasing the confidence that the final descriptions would better represent a concept to be learned. However, such final concept descriptions represent a model of an object which is still learned from the entire erroneous training data set.

Figure 7:
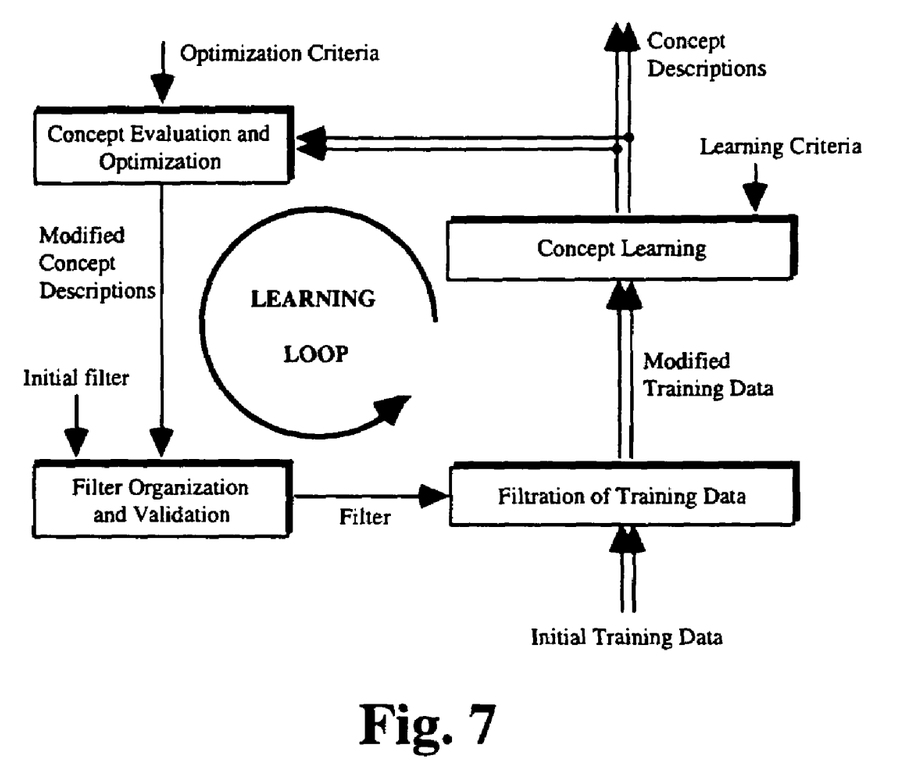
FIG. 7 is a schematic diagram of a learning loop architecture according to the invention.

The approach we developed for noise-tolerant symbolic learning extends the traditional one step learning into a closed-loop multiple step learning [Pachowicz and Bala, 1994]. Processes of concept acquisition, optimization and data filtration are organized within the loop presented in FIG. 7. The learning loop includes:

1) Concept acquisition by a concept learner such as AQ [Miachalski, 1983] learning program,
2) Evaluation of learned class descriptions and detection of these concept components which less likely represent data patterns or which interfere with descriptions of other classes creating confusion in class separability over the attribute space,
3) Optimization of class descriptions according to pre-defined criteria of class description evaluation,
4) Formulation of a 'filter' from modified concept descriptions, and the filtration of training data.

This learning loop can be run once (i.e., the concept learner is activated twice) or multiple times (i.e., n times, where the concept learner is activated n+1 times) with changing learning and/or optimization criteria.

Consequently, those training examples which caused the generation of pruned/truncated concept components are no longer taken into account when concept learning is repeated. In this way, some erroneous training data can be detected and eliminated, so they will not influence the generation of the final concept descriptions.

In the closed-loop learning approach, the intermediate concept descriptions are used to actively improve training data. The acquisition and pruning/truncation of these intermediate descriptions can be guided iteratively by different criteria. Since the detection of erroneous examples is executed on the concept description level rather than on the input data level, data filtration reflects attribute combination in the construction of concept descriptions and inter-class distribution over the attribute space. The final concept descriptions are learned from improved data sets, and they should outperform concept descriptions learned from the initial data set.

Additionally, complexity of final concept descriptions should be decreased because the erroneous training examples which cause split of more general concept components will be eliminated. In order to derive homogenous areas representing concept descriptions and to improve borders between concept descriptions of different classes, one has to merge partitioned concept components. This merging is executed over the space recovered by the removal of less significant concept components of counter-class descriptions.

In summary, the first novel aspect of this approach is that rules/trees optimized through disjunct/subtree removal are used to filter noisy examples, and then the filtered set of training data is used to re-learn improved rules/decision trees. The second novel aspect is that noise detection is done on the higher level evaluating learned object model rather than raw data. The third aspect is that noise removal from training data set is driven by modified object model, it can be run iteratively, and it does not depend on a-priori information about attribute and/or noise distributions. This approach should be particular effective for learning from data sets influenced by non-systematic error.

Figure 8:
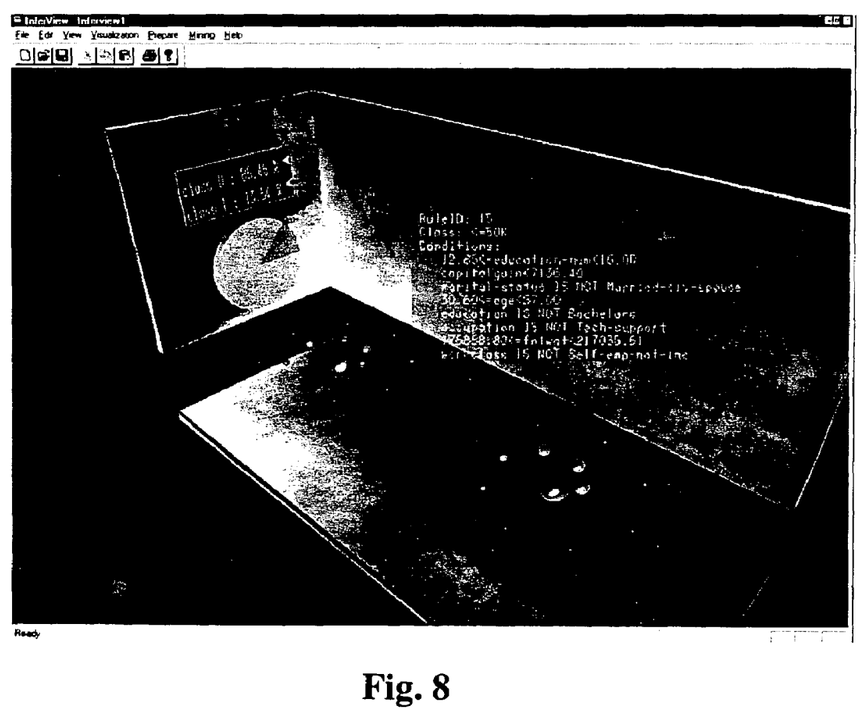
FIG. 8 is a further screen show from a computer display of the visualization space.

A finished display of the element is shown in FIG. 8, including the elements discussed in greater detail above.

Although other modifications and changes may be suggested by those skilled in the art, it is the intention of the inventors to embody within the patent warranted hereon all changes and modifications as reasonably and properly come within the scope of their contribution to the art.

I claim:

1. A method for visualization of data knowledge on a computer, comprising the steps of:
    performing data mining of data to generate rules;
    representing said rules as objects in a three-dimensional space, said three-dimensional space having a center position and a plurality of outlying positions, said objects being displayed in at least one group, said objects in said at least one group arranged in positions according to rule strength, said object in said at least one group having the highest rule strength being positioned in said center position and said objects having lesser rule strength being positioned in said plurality of outlying positions;
    displaying said three-dimensional space on a graphical user interface; and
    permitting using navigation and zooming in said three-dimensional space using a computer input apparatus.

2. A method as claimed in claim 1, wherein said step of representing represents all rules generated during said data mining as objects in the three-dimensional space, said objects in three-dimensional space being separated into a plurality of groups, said groups being shown separated from one another.

3. A method as claimed in claim 1, wherein said step of representing represents less than all rules generated during said data mining.

4. A method as claimed in claim 1, wherein said rules are represented as spheres in the three-dimensional space on the graphical user interface, and said spheres of said at least one group are displayed in spiral arrangement.

5. A method as claimed in claim 4, wherein said spheres have a size representing a relative number of examples covered by the corresponding rule.

6. A method as claimed in claim 1, further comprising the step:
   displaying information on a rule upon selection of a three-dimensional object corresponding to the rule.

7. A method as claimed in claim 6, wherein said displaying step displays an index of the corresponding rule.

8. A method for cleansing noise from data, comprising the steps of:
   generating objects for display representing rules obtained by data mining in a database;
   grouping the objects according to rule class, said grouping presenting the objects as a plurality of visually separate groups, each group having a center position and a plurality of outlying positions;
   positioning objects within a group according to rule strength, the object having the highest rule strength being positioned in the center position within each group and the objects having a lesser rule strength being positioned in said plurality of outlying positions within each group; and
   filtering out objects of lesser rule strength from said display of objects in at least one of said groups, including the sub-steps of:
   acquisition of a concept by a concept learner;
   evaluation of learned class descriptions and detection of concept components;
   optimization of class descriptions according to predetermined criteria of class description evaluation; and
   formulation of a filter for modified concept descriptions and filtration of training data; and
   displaying the plurality of visually separate groups of objects on a graphical user interface.

9. A method as claimed in claim 8, further comprising the steps of:
   applying a closed loop learning approach;
   running a learning program at least two times including a first run to acquire model descriptions and a second run to acquire detailed descriptions; and
   using filtered training data on said second run.

10. A method as claimed in claim 1, wherein said computer input apparatus is a computer keyboard and mouse-like apparatus.

11. A method as claimed in claim 1, wherein said rules of said at least one group are displayed as a spiral arrangement of spheres, said rules of lesser strength being displayed at outer portions of said spiral arrangement.

12. A method as claimed in claim 1, wherein said at least one group is a plurality of groups, each of said plurality of groups being represented as classes of rules.

13. A method as claimed in claim 1, further comprising the step of:
   upon selection of one of said objects corresponding to a rule, displaying raw data covered by the rule.

14. A method as claimed in claim 13, wherein said displaying step displays the raw data as a projection on a graph.

15. A method as claimed in claim 1, further comprising the steps of:
   selectively displaying walls of the three-dimensional space; and
   selectively displaying a floor of the three-dimensional space.

16. A method as claimed in claim 1, wherein said rules are generated by an inferencing engine.

17. A software program operable on a computer to carry out a method for visualization of data knowledge on a computer, comprising the steps of:
   performing data mining of data to generate rules;
   representing said rules as objects in a three-dimensional space, said three-dimensional space having a center position and a plurality of outlying positions, said objects being displayed in at least one group, said objects in said at least one group arranged in positions according to rule strength, said object in said at least one group having the highest rule strength being positioned in said center position and said objects having lesser rule strength being positioned in said plurality of outlying positions;
   displaying said three-dimensional space on a graphical user interface; and
   permitting using navigation and zooming in said three-dimensional space using a computer input apparatus.

* * * * *